United States Patent [19]
Bretl et al.

[11] Patent Number: 5,173,774
[45] Date of Patent: Dec. 22, 1992

[54] DUAL PURPOSE HDTV/NTSC RECEIVER

[75] Inventors: Wayne E. Bretl, Schaumburg; Paul A. Snopko, Chicago, both of Ill.

[73] Assignee: Zenith Electronics Corporation, Glenview, Ill.

[21] Appl. No.: 629,523

[22] Filed: Dec. 18, 1990

[51] Int. Cl.$^5$ ............................................ H04N 7/01
[52] U.S. Cl. ...................................... 358/140; 358/11; 358/141; 358/12
[58] Field of Search ................ 358/140, 141, 12, 11, 358/14, 180, 158

[56] References Cited

U.S. PATENT DOCUMENTS

| | | | |
|---|---|---|---|
| 4,414,571 | 11/1983 | Kureha et al. | 358/158 |
| 4,670,784 | 6/1987 | Goldberg | 358/141 |
| 4,800,426 | 1/1989 | Glenn | 358/12 |
| 4,931,855 | 6/1990 | Salvadorini | 358/141 |
| 4,984,081 | 1/1991 | Miyoshi et al. | 358/180 |

Primary Examiner—James J. Groody
Assistant Examiner—Glenton B. Burgess

[57] ABSTRACT

A dual purpose receiver can receive and process either 525-line NTSC signals or 787.5-line HDTV signals without the use of costly interlace-to-progressive scan conversion circuitry. The 525-line signal can either be stored a line at a time and repeated twice to create a 1575-line format, or it can also interpolate values based on the two adjacent received lines to create a form of averaging in the 1575-line format. The invention is not restricted to use with NTSC/HDTV systems.

27 Claims, 3 Drawing Sheets

○ 14 525 INTERLACE LINE
○ 16 787.5 PROGRESSIVELY SCANNED LINE
▽ 18 1575 INTERLACED LINE

| LINE NUMBER | SIGNAL IN | SIGNAL OUT | S78 POS. | S80 POS. | S82 POS. | S104 POS. |
|---|---|---|---|---|---|---|
| 1 | C | A | * | * | 88 | 102 |
| 3 | C | (2A+B)/3 | 84 | 92 | * | 105 |
| 5 | C | (A+2B)/3 | 90 | 86 | * | 105 |
| 7 | A' | B | * | * | 94 | 102 |
| 9 | A' | (2B+C)/3 | 90 | 98 | * | 105 |
| 11 | A' | (B+2C)/3 | 96 | 92 | * | 105 |
| 13 | B' | C | * | * | 100 | 102 |
| 15 | B' | (2C+A')/3 | 96 | 86 | * | 105 |
| 17 | B' | (C+2A')/3 | 84 | 98 | * | 105 |
| 19 | C' | A' | * | * | 88 | 102 |

\* NOT RELEVANT

Fig. 5

DUAL PURPOSE HDTV/NTSC RECEIVER

BACKGROUND OF THE INVENTION

This invention relates to the field of television receivers and, more particularly, to receivers for receiving both 525-line interlaced pictures and 787.5-line progressively scanned pictures.

At the present time, there are millions of television receivers in use throughout the world. In the United States and a number of other countries these receivers are designed to use a set of television standards established in 1939 for black and white pictures by the National Television Systems Committee (NTSC) under the auspices of the Federal Communications Commission (FCC), and modified in 1953 to include color displays. However, there is an active interest in obtaining pictures with higher resolution than is possible within the NTSC standards. A number of systems have been proposed or are being developed which provide some measure of higher resolution, but many of these systems are not compatible with present receivers. One answer to the requirement for compatibility is some means for providing dual function in a receiver; i.e., the capability of receiving both NTSC and HDTV signals. In presently known systems for providing both capabilities in a single receiver, a relatively complicated process is required for converting the interlaced scan of the NTSC system to a progressive scan since it is necessary to store an entire frame at a time and "re-scan" the frame in order to perform the conversion. This large amount of storage and associated logic adds an undesirable expense in the receiver. It is a desirable goal to provide a dual function receiver without such an expensive process.

SUMMARY OF THE INVENTION

It is an object of the present invention to provide a dual purpose receiver for both HDTV and NTSC pictures.

It is a particular object to provide a receiver capable of displaying 525-line interlaced pictures as well as 787.5-line progressively scanned pictures.

It is a more specific object to provide such a receiver without requiring an expensive interlaced-to-progressive scan conversion.

These objects and others which will become apparent are achieved in one embodiment of the present invention by storing each line of the 525-line NTSC picture and repeating that line three times within an interval 1/H, where H is the horizontal scanning rate, and providing a 1575-line picture which can then be processed by the receiver. In another embodiment, instead of repeating a line as originally received, the second and third lines are obtained by interpolating between the values of the first and second received lines.

BRIEF DESCRIPTION OF THE DRAWING

FIG. 5 is a chart relating to the diagram of FIG. 4.

DETAILED DESCRIPTION OF THE PREFERRED EMBODIMENTS

Figure 1:
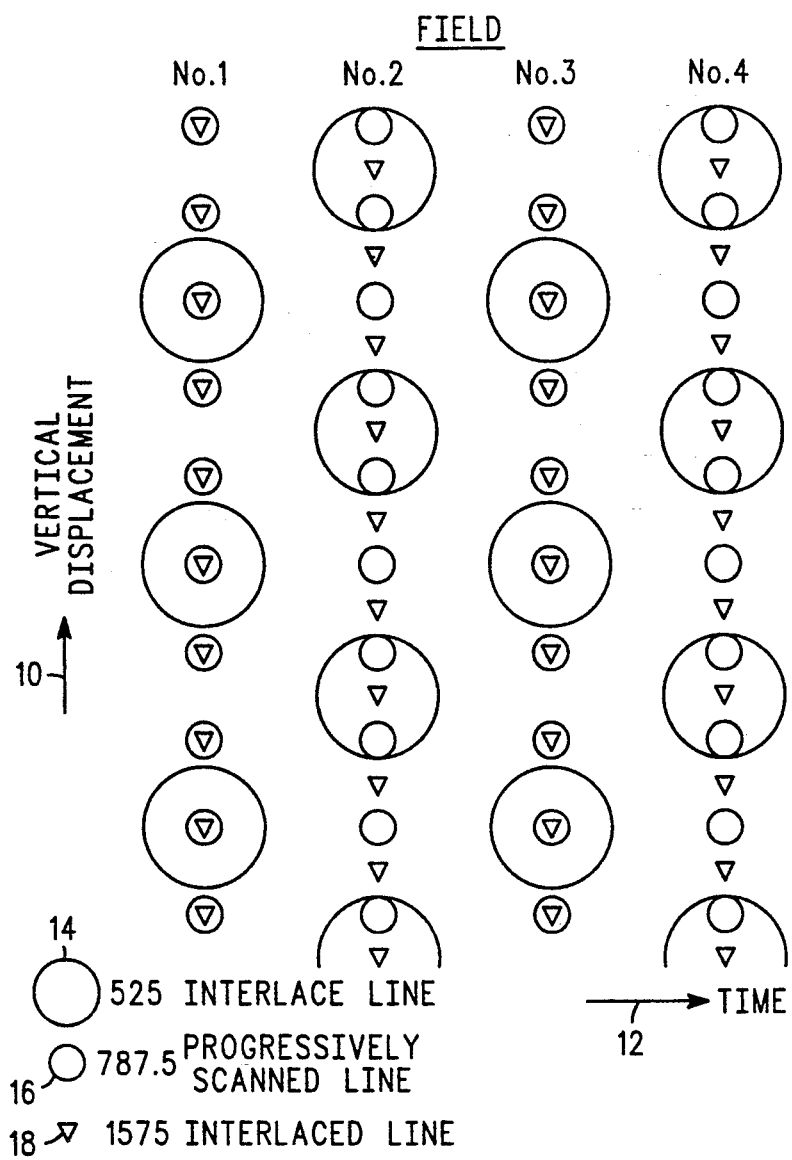
FIG. 1 is a representation of the location of the picture elements in a display in a dual purpose receiver according to the present invention.

FIG. 1 shows a representation of a display illustrating the principle of the present invention. It is assumed here that the receiver is one which is designed for a high definition television signal having a 787.5-line, progressively scanned raster wherein it is desired to accommodate a signal having a 525-line interlaced raster. The vertical dimension 10 shows the vertical displacement of the elements of the display. The horizontal dimension 12 illustrates the displacement of four consecutive fields but is actually, of course, time. As shown, a symbol 14 indicates the relative positions of the elements of the 525 interlaced lines of the NTSC system. A symbol 16 indicates the relative positions of the elements of the 787.5 progressively scanned lines of the high definition display. The 787.5 line raster may be provided by scanning 787 lines in one field and 788 lines in the alternate field, with each field caused to start in the same position. In the present system, there are 1575 vertical lines, interlaced. The symbols 18 indicate the relative positions of the elements of the 1575 line interlaced display.

It will be seen that, in the 787.5-line progressive receiver, the scanning line locations are identical in each field with the 787-line and 788-line signals being used in alternate fields. This is accomplished in one of several possible ways including D.C. coupling and/or clamping the vertical deflection waveform so that each field starts at the same position. If the vertical retrace is caused to happen at a constant rate of 1/787.5 times the horizontal rate, the scan becomes 1575 lines with 2:1 interlace. Therefore, the centers of every third 1575-line, 2:1 interlace scan correspond to the centers of the 525-line, 2:1 interlace. The 525-line picture may then be displayed on the 1575-line raster by storing each line as received and playing it back three times in sequence at three times the storage rate.

The process described above eliminates the need for full interlaced-to-progressive scan conversion. If desired, the three playback signals may be weighted differently from each other, essentially providing vertical filtering and giving different equivalent scanning line shapes for the reproduced 525-line information. The horizontal scanning rate is not affected in any way during switching from the 787/788 or 787.5 progressive scan to the 1575 interlaced process.

Figure 2:
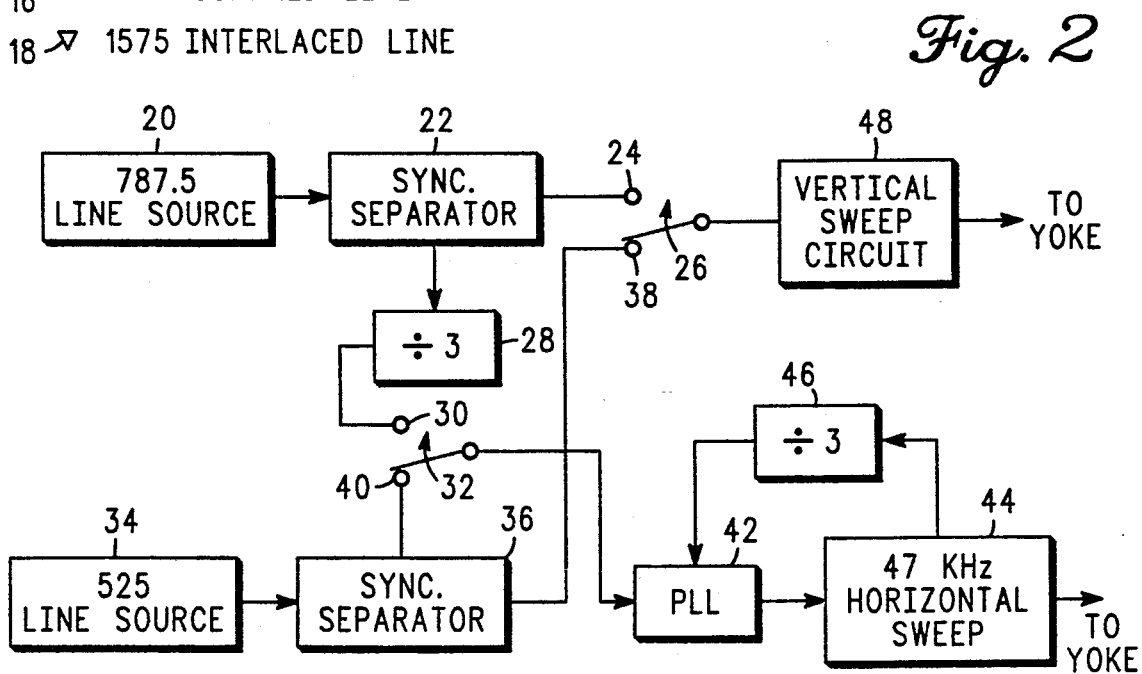
FIG. 2 is a block diagram of a first portion of a first embodiment of the dual purpose receiver.

The block diagram of FIG. 2, which relates to the deflection portion of the receiver, shows a 787.5-line source 20 coupled to a sync separator 22 which outputs the 787/788 vertical sync signal to one input position 24 of a switch 26. The vertical sync signal in this case defines alternate vertical intervals of 3H/787 and 3H/788, where H=NTSC scanning rate. A second output of the sync separator 22 is the horizontal sync signal of the 787.5-line signal, 47 KHz, which is coupled through a divide-by-three circuit 28 to one input position 30 of a second switch 32.

A 525-line source 34 is coupled to a second sync separator 36 which outputs the 525-line vertical sync signal to a second input 38 of the switch 26. In this case the vertical sync signal defines a series of equal vertical intervals of duration H/262.5. A second output of the sync separator 36 is the 525-line horizontal sync signal, 15.7 KHz, which is coupled to a second input 40 of the switch 32. The switches 26 and 32 could be manually operated or signal-activated. The output of the switch 32 is coupled to a PLL 42 and the output of the PLL 42 is coupled to a 47 KHz horizontal sweep circuit 44. The PLL 42 includes a 47 KHz horizontal sweep oscillator which would lock to the horizontal sync signal of either the received NTSC signal or the received 787.5-line HDTV signal. The sweep circuit 44 is coupled back to the PLL 42 through a divide-by-three circuit 46. The output of the switch 26 is coupled to a vertical sweep circuit 48. The outputs of the sweep circuits 44 and 48 are coupled to the yoke circuits as is customary.

Figure 3:
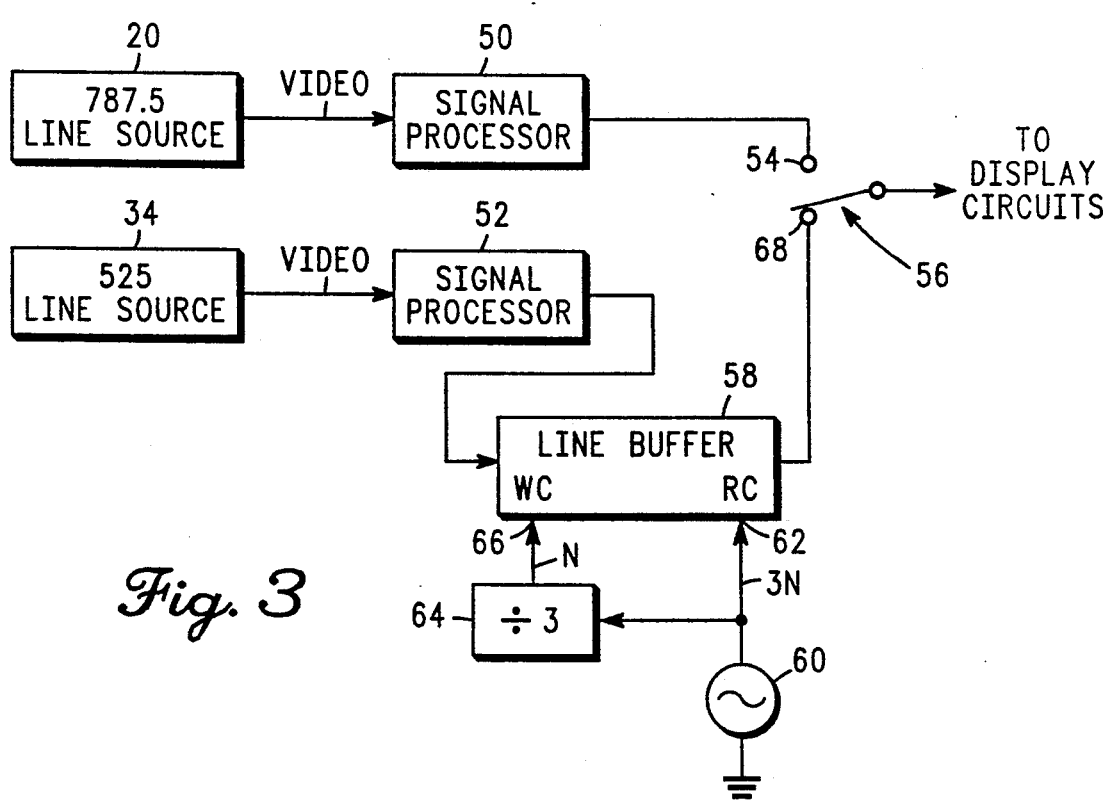
FIG. 3 is a block diagram of a second portion of the first embodiment.

The simplified block diagram of FIG. 3 relates to the video portion of the receiver. The 787.5-line and 525-line sources 20 and 34 of FIG. 2 also output video signals to two signal processors 50 and 52, respectively. The video signals from the signal processor 50 are coupled to one input 54 of a switch 56, the output of which is coupled to display circuits. As with switches 26 and 32, switch 56 could be manually operated or signal-activated. The output of the signal processor 52 is coupled to a line buffer 58. The buffer 58 is of the type having a non-destructive read-out since each line will be read three times. The buffer 58 is coupled to a clock generator 60, receiving a "read" clock signal "3N" at three times the incoming signal rate "N" at an input 62. The clock generator 60 is also coupled to a divide-by-three circuit 64 to provide a "write" clock signal "N" at a second input 66 of the buffer 58. The output of the buffer 58 is coupled to a second input 68 of the switch 56. The output of the switch 56 is coupled to the display circuits of the receiver and provides each received line three times in sequence at three times the received rate, thereby providing an equivalent 1575-line signal.

Figure 4:
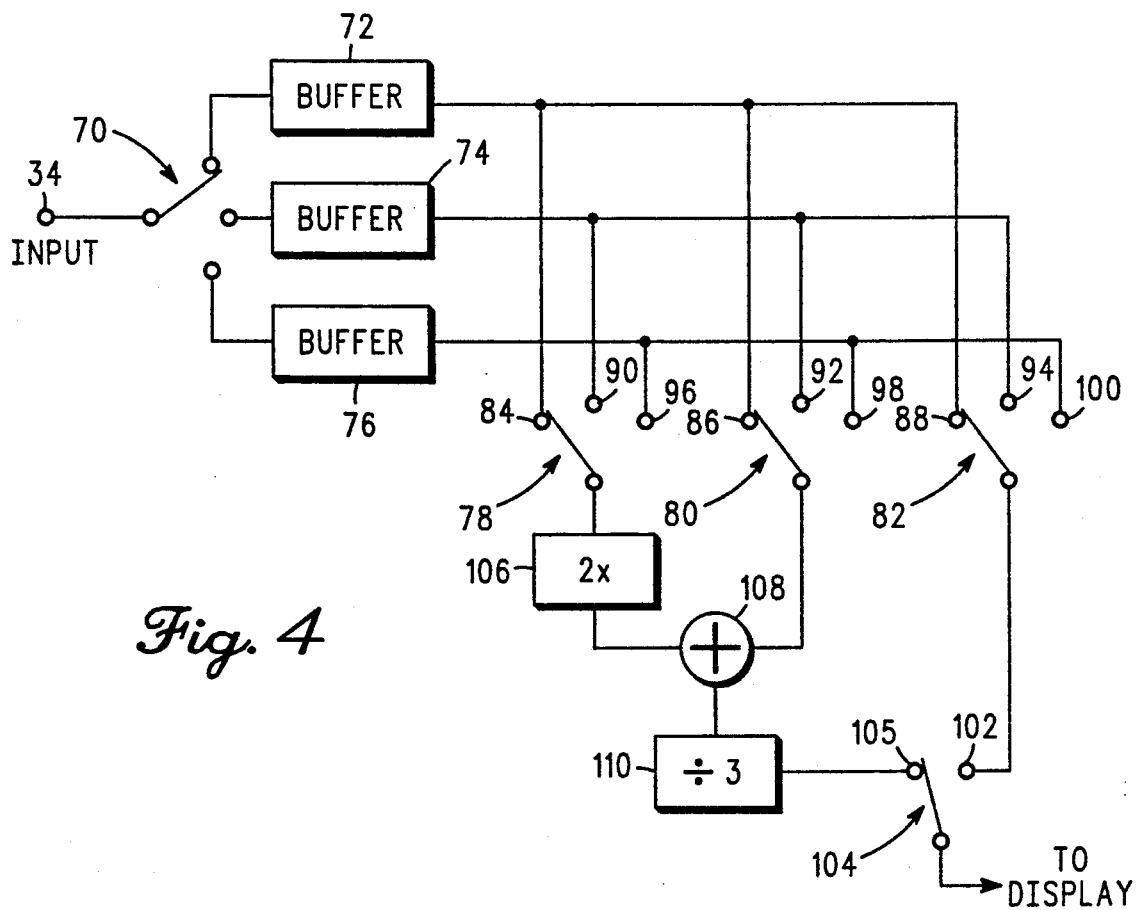
FIG. 4 is a block diagram of a portion of a second embodiment of the receiver of the invention.

FIG. 4 and FIG. 5 illustrate a second embodiment of the invention wherein three closely related but not identical lines are used. Instead of merely storing the lines of the 525-line display and repeating each one as is three times, each original line would be stored and used intact once, with the adjacent lines obtained by interpolation of adjacent original lines, using the factors of $\frac{1}{3}$ and $\frac{2}{3}$. Thus, in a frame where the first and second lines of the received first field (lines 1 and 7 of the processed 1575-line picture) are A and B, respectively, the first line L1 of the 1575-line display would be A and the seventh line of the 1575-line display would be B. The third line L3 of the display would be: $L3=(2A+B)/3$, and the fifth line L5 of the display would be: $L5=(A+2B)/3$. In the lines of the second field, the values of the original and interpolated lines are obtained from the received signal as in the first field and interlaced as usual to provide the full frame.

FIG. 4 illustrates an embodiment of the logic for accomplishing the interpolation described above. The 525-line NTSC signal source 34 is coupled to a switching circuit 70 which, in turn, is coupled to store a first line A (then a fourth line A') of the signal in a line buffer 72, a second line B (then a fifth line B') in a line buffer 74, and a third line C (then a sixth line C') in a line buffer 76. Each buffer is coupled to three switching circuits 78, 80, 82 which are individually signal-activated. The buffer 72 is coupled to first inputs 84, 86, 88 of the respective switching circuits. The buffer 74 is coupled to second inputs 90, 92, 94 of the respective switching circuits. The buffer 76 is coupled to third inputs 96, 98, 100 of the respective switching circuits. The output of the switching circuit 82 is coupled to a first input 102 of another switching circuit 104, the output of the circuit 104 being coupled to the display circuitry (not shown) of the receiver.

On the chart of FIG. 5, the first column gives the output line number in a field of a processed 1575-line display. The second column gives the signal being input to the switch 70; e.g., for output Line 1 the input signal is C, while previously input signals A and B are already stored in the respective buffers 72, 74. The third column gives the signal as used by the display. The fourth, fifth, sixth and seventh columns give the positions of the switches 78, 80, 82, 104 at that time. Thus, as in the example given above for output line L5, the signal C will be being inputted to buffer 76, and the output signal to the display will be $(A+2B)/3$, since switch 78 is coupled to position 90, and switch 80 is coupled to position 86. The signal B, therefore, is coupled through switching circuit 78, a times-two multiplier circuit 106, an adder 108 and a divide-by-three circuit 110, obtaining 2B/3. The signal A is processed through the switch 80, the adder 108 and the divide-by three circuit 110, obtaining A/3. The position of switch 82 is not relevant in this instance since the switch 104 is coupled to position 105, not position 102. Note that in FIG. 5 irrelevant values are marked with an asterisk. The lines of the second field of the frame would be processed in similar fashion and interlaced as usual.

It is obvious to one skilled in the art that the factors of $\frac{1}{3}$ and $\frac{2}{3}$ as used herein are exemplary only and that other factors could be used if desired. It is also apparent that the invention does not apply solely to the combination of NTSC and HDTV systems but is applicable to other systems as well; e.g., the invention could use the European 625-line (interlaced) system with the factors of $\frac{1}{3}$ and $\frac{2}{3}$ to produce a 937.5-line (progressive) system.

There has been shown and described the means for inexpensively providing the capability of utilizing two types of signals, having different structures, in one video receiver. Other variations and modification will be apparent to those skilled in the art and are included in accordance with the appended claims.

What is claimed is:

1. A dual purpose television receiver comprising:
    means for developing 525-line, 2:1 interlaced signal and a 787.5-line progressively scanned signal;
    means for converting said 525-line, 2:1 interlaced signal to a 1575-line, 2:1 interlaced signal;
    deflection means responsive to said 525-line signal and said 787.5-line signal for providing respective first and second deflection signals; and
    display means responsive to said first deflection signal for displaying said 1575-line signal and responsive to said second deflection signal for displaying said 787.5-line signal.

2. The dual purpose television receiver according to claim 1 and wherein said converting means comprises means for developing a plurality of lines intermediate each successive pair of lines of said 525-line signal, the lines of said 525-line signal and said intermediate lines forming said 1575-line signal.

3. The dual purpose television receiver according to claim 1 and wherein said converting means includes storage means for storing a line of said 525-line signal and means for producing intermediate lines having values equal to said stored line.

4. The dual purpose television receiver according to claim 1 and wherein said converting means includes storage means for storing at least three consecutive lines of said 525-line signal and means for combining a fraction of one stored line with a fraction of the subsequent stored line for producing said intermediate lines.

5. The dual purpose television receiver according to claim 4 wherein said fractions comprise one-third and two-thirds.

6. The dual purpose television receiver according to claim 5 wherein said converting means provides interpolated lines having one-third the value of one of the adjacent lines of said 525-line signal and two-thirds the value of the other of the adjacent lines.

7. The dual purpose television receiver according to claim 1 wherein said converting means includes storage means and clock means coupled to said storage means whereby the lines of the 525-line signal are stored at a first rate which is an integral multiple of a second rate at which the stored lines are read out of said storage means.

8. The dual purpose television receiver according to claim 1 and further including first sync separation means coupled to said developing means and switchably coupled to the vertical sweep circuit of said receiver.

9. The dual purpose television receiver according to claim 8 and wherein said first sync separation means is also switchably coupled to said horizontal sweep circuit of said receiver.

10. The dual purpose television receiver according to claim 1 and further including second sync separation means coupled to said developing means and switchably coupled to the vertical sweep circuit of said receiver.

11. The dual purpose television receiver according to claim 10 and wherein said second sync separation means is also switchably coupled to said horizontal sweep circuit of said receiver.

12. A dual purpose television receiver comprising:
means for receiving a first television signal characterized by a 525-line, 2:1 interlaced structure having a horizontal scanning rate H and a vertical repetition rate of H/262.5, and a second television signal characterized by a progressively scanned alternating 787/788-line structure having a horizontal scanning rate 3 H and alternating vertical repetition periods of 3H/787 and 3H/788;
horizontal deflection means responsive to either one of said first and second television signals for providing a horizontal deflection signal having a rate equal to 3 H;
vertical deflection means responsive to said first television signal for providing a first vertical deflection signal having a repetition period equal to H/262.5 and responsive to said second television signal for providing a second vertical deflection signal having alternating repetition periods of 3H/787 and 3H/788;
processing means for converting the lines of said first television signal into a plurality of related lines for providing a modified television signal having three lines within an interval 1/H; and
means responsive to said horizontal deflection signal and said first vertical deflection signal for displaying said modified television signal in the form of a 1575-line, 2:1 interlaced raster, and responsive to said horizontal deflection signal and said second vertical deflection signal for displaying said second television signal in the form of a progressively scanned raster alternately comprising 787- and 788-lines.

13. A dual purpose television receiver according to claim 12 wherein said processing means includes means for converting values based on the values of the lines of said first television signal to produce lines which are displayed intermediate said first television signal lines.

14. The dual purpose television receiver according to claim 13 and wherein said converting means includes storage means for storing a line of said first television signal, and said lines displayed between the received lines have values equal to the values of said stored line.

15. The dual purpose television receiver according to claim 13 wherein said converting means includes storage means for storing at least three consecutive lines of said first television signal and means for combining a fraction of one stored line with a fraction of the subsequent stored line.

16. The dual purpose television receiver according to claim 15 wherein said combining means provides intermediate lines having one-third the value of one of the adjacent first television signal lines and two-thirds the value of the other of the adjacent first television signal lines.

17. The dual purpose television receiver according to claim 12 and wherein said second television signal can be utilized by the receiver to produce a high definition television display.

18. The dual purpose television receiver according to claim 12 and wherein said first television signal is a signal according to the National Television Systems Committee standards.

19. The dual purpose television receiver according to claim 12 and further including switching means coupled to control portions of the deflection circuitry of the receiver.

20. The dual purpose television receiver according to claim 12 wherein said processing means includes storage means and clock means coupled to said storage means whereby the lines of the first received signal are stored at a first rate which is an integral multiple of a second rate at which the stored lines are read out of said storage means.

21. The dual purpose television receiver according to claim 12 and further including first sync separation means coupled to said receiving means and switchably coupled to the vertical sweep circuit of said receiver.

22. The dual purpose television receiver according to claim 21 and wherein said first sync separation means is also switchably coupled to said horizontal sweep circuit of said receiver.

23. The dual purpose television receiver according to claim 12 and further including second sync separation means coupled to said receiving means and switchably coupled to the vertical sweep circuit of said receiver.

24. The dual purpose television receiver according to claim 23 and wherein said second sync separation means is also switchably coupled to said horizontal sweep circuit of said receiver.

25. The dual purpose television receiver according to claim 1 wherein said deflection means comprises horizontal deflection means for providing a common horizontal deflection signal in response to said 525-line signal and said 787.5-line signal.

26. The dual purpose television receiver according to claim 25 wherein said common horizontal deflection signal has a frequency substantially equal to three times the NTSC horizontal scanning rate.

27. The dual purpose television receiver according to claim 25 wherein said deflection means comprises vertical deflection means for providing a first vertical deflection signal in response to said 525-line signal and a second vertical deflection signal in response to said 787.5-signal.

* * * * *